No. 885,444. PATENTED APR. 21, 1908.
A. W. CRAM.
MIXING SPOON.
APPLICATION FILED APR. 13, 1906.
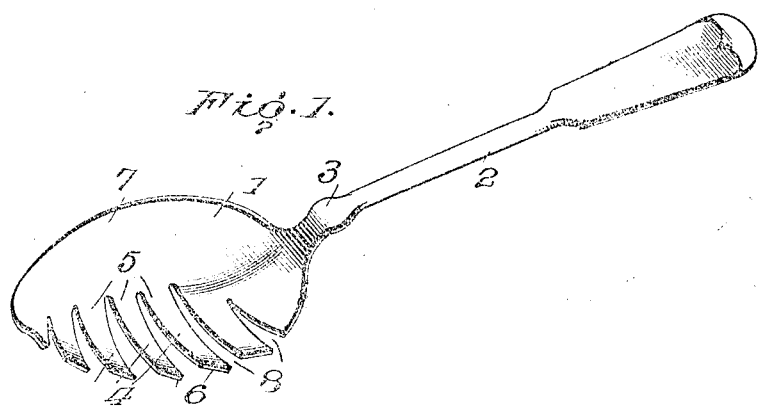
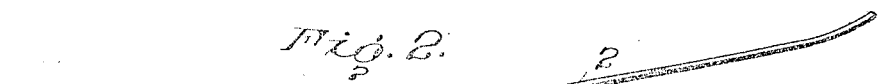
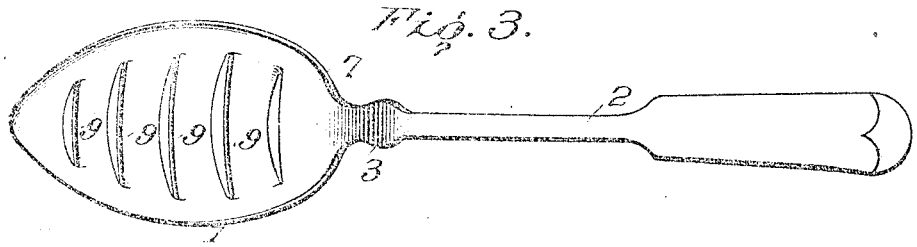
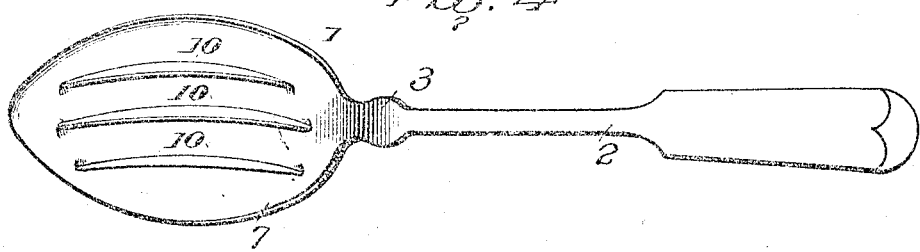

UNITED STATES PATENT OFFICE.

ALONZO W. CRAM, OF HAVERHILL, MASSACHUSETTS.

MIXING-SPOON.

No. 885,444.

Specification of Letters Patent.

Patented April 21, 1908.

Application filed April 13, 1906. Serial No. 311,576.

*To all whom it may concern:*

Be it known that I, ALONZO W. CRAM, a citizen of the United States, residing at Haverhill, in the county of Essex and State of Massachusetts, have invented certain new and useful Improvements in Mixing-Spoons, of which the following is a specification, reference being had therein to the accompanying drawing.

My invention relates to improvements in mixing spoons.

The object of my invention is to provide a mixing-spoon of this character which is provided with blades or fingers set at an angle to the body of the spoon and causing a greater agitation of the material being mixed.

Another object of my invention is to provide a more simple, cheap and effective mixing spoon of this character.

In the accompanying drawings, Figure 1, is a perspective view of my improved mixing spoon. Fig. 2, is a side elevation of Fig. 1. Fig. 3, is a top plan view of another form of mixing spoon embodying my invention. Fig. 4, is a top plan view of a still further modification embodying my invention.

Referring now to the drawings, 1 represents the bowl portion of my improved mixing spoon which, as shown, is of a concaved form and the contour being approximately that of an ordinary spoon. The bowl is provided with the usual handle 2 arranged with the off-set 3, and at one side the bowl is provided with a series of curved blades 4, the said curve being the same as the remainder of the bowl. The said blades are gradually twisted longitudinally thereof and start at the inner end 5 where the blades are connected to the bowl of the spoon. The twist of the blades is such that the outer ends 6 are at an angle of about forty-five degrees with the bowl, and the said outer ends are in a line to form a curve to correspond with the edge 7 of the bowl. The blades all start at a point approximately in a line extending longitudinal the bowl, and thus the blades gradually decrease in length from the center of the bowl towards each end.

The blades being set at an angle as shown, form the inclined slots 8 between the same, and during the mixing or beating action the material being beaten or mixed is caused to travel upward over the inclined blades, and thus is more thoroughly beaten or mixed.

In Fig. 3 I have shown a modification in which the blades 9 are formed in the center of the bowl, and extend transverse thereof adjacent each edge, the action of the blade on the material being the same as that of the form shown in Fig. 1. In Fig. 4, instead of having the blades extend transverse the bowl, the blades 10 extend longitudinally of the bowl. In both of these forms, the blades are set at an angle of about forty degrees throughout their length.

Having thus described my invention, what I claim and desire to secure by Letters Patent, is:—

1. A mixing spoon comprising a bowl, blades formed therein extending transverse of the bowl, and curved to correspond with the bowl and having free outer ends.

2. A mixing spoon comprising a bowl, blades formed therein and extending transverse of the bowl and curved to correspond with the bowl, and having free outer ends, said blades set at an angle thereto longitudinally of their length.

3. A mixing spoon, comprising a bowl, blades formed therein and extending transverse of the bowl and curved to correspond with the bowl, said blades set at an angle thereto longitudinally of their length, and their outer ends in a curved line corresponding with that of the outer side of the bowl.

4. A mixing spoon, comprising a bowl, blades formed therein and extending transverse of the bowl and having their outer free ends in a curved line corresponding with that of the other side of the bowl, said blades of a curvature to correspond with the bowl and twisted longitudinally thereof.

In testimony whereof I affix my signature in presence of two witnesses.

ALONZO W. CRAM.

Witnesses:
 WILLIAM D. CRAM,
 FRANK T. FISCHER.